(12) United States Patent
Zuo et al.

(10) Patent No.: US 11,891,997 B2
(45) Date of Patent: Feb. 6, 2024

(54) TWO-DIMENSIONAL MOTOR PISTON PUMP

(71) Applicants: ZHEJIANG UNIVERSITY, Hangzhou (CN); HANGZHOU CITY UNIVERSITY, Hangzhou (CN); WENZHOU UNIVERSITY, Wenzhou (CN)

(72) Inventors: Qiang Zuo, Hangzhou (CN); Longlong Leng, Hangzhou (CN); Qilin Jin, Hangzhou (CN); Yan Ren, Wenzhou (CN); Zhuhua Deng, Hangzhou (CN); Wei Shao, Hangzhou (CN); Quankun Li, Hangzhou (CN); Pengfei Wang, Hangzhou (CN); Zheng Wang, Hangzhou (CN); Liying Lou, Hangzhou (CN); Yanwei Zhao, Hangzhou (CN)

(73) Assignees: ZHEJIANG UNIVERSITY, Hangzhou (CN); HANGZHOU CITY UNIVERSITY, Hangzhou (CN); WENZHOU UNIVERSITY, Wenzhou (CN)

( * ) Notice: Subject to any disclaimer, the term of this patent is extended or adjusted under 35 U.S.C. 154(b) by 0 days.

(21) Appl. No.: 18/314,150

(22) Filed: May 9, 2023

(65) Prior Publication Data
US 2023/0374986 A1 Nov. 23, 2023

(30) Foreign Application Priority Data
May 19, 2022 (CN) .......................... 202210542411.8

(51) Int. Cl.
*F04C 9/00* (2006.01)
*H02K 1/2786* (2022.01)
*H02K 7/14* (2006.01)

(52) U.S. Cl.
CPC ............. *F04C 9/00* (2013.01); *H02K 1/2786* (2013.01); *H02K 7/14* (2013.01); *F04C 2240/30* (2013.01); *F04C 2240/40* (2013.01)

(58) Field of Classification Search
CPC .... F04C 9/00; F04C 2240/30; F04C 2240/40; H02K 1/2786; H02K 7/14
See application file for complete search history.

(56) References Cited

FOREIGN PATENT DOCUMENTS

| CN | 102420496 A | 4/2012 |
|----|-------------|--------|
| CN | 107288874 A | 10/2017 |

(Continued)

OTHER PUBLICATIONS

Raw Machine Translation of CN111502951A, "Roller type force balance unit pump" Ruan et al., Aug. 7, 2020.*

(Continued)

*Primary Examiner* — Charles G Freay
*Assistant Examiner* — Lilya Pekarskaya

(57) ABSTRACT

The present disclosure provides a two-dimensional motor piston pump, including a two-dimensional motor and a two-dimensional piston pump. The two-dimensional motor and the two-dimensional piston pump are nested with each other and arranged coaxially. The two-dimensional motor includes a stator and an outer rotor, and the outer rotor is coaxial with the stator and is sleeved outside the stator. The two-dimensional piston pump includes: a flow distribution mechanism including a flow distribution rotor and a pump body, a piston mechanism including a left cam and a right cam; a roller assembly including a roller and a roller shaft, and a pump housing, a left end cover, and a right end cover.

5 Claims, 2 Drawing Sheets

(56) References Cited

FOREIGN PATENT DOCUMENTS

| | | | | | |
|---|---|---|---|---|---|
| CN | 108482308 | A | | 8/2018 | |
| CN | 109282979 | A | | 1/2019 | |
| CN | 107747531 | B | * | 5/2020 | ............... F04B 1/16 |
| CN | 111502951 | A | * | 8/2020 | |
| JP | 2000303986 | A | | 10/2000 | |
| WO | 2018014472 | A1 | | 1/2018 | |
| WO | 2020202390 | A1 | | 10/2020 | |

OTHER PUBLICATIONS

Wang et al, "Design and research of 2D piston pumps with a stacked cone roller set", First published online Dec. 7, 2021.*

Xing et al., "Two-dimensional piston pump: Principle, design and testing for aviation fuel pumps", 2020.*

* cited by examiner

US 11,891,997 B2

TWO-DIMENSIONAL MOTOR PISTON PUMP

CROSS REFERENCE

The present application claims foreign priority of Chinese Patent Application No. 202210542411.8, filed on May 19, 2022, in the China National Intellectual Property Administration, the entire contents of which are hereby incorporated by reference in its entirety.

TECHNICAL FIELD

The present disclosure relates to the field of motor technologies, and in particular to a two-dimensional motor piston pump including a two-dimensional motor and a two-dimensional piston pump.

BACKGROUND

An electric motor is a component that converts electrical energy into mechanical energy to provide power, and serves as a power source for pumps. An external rotor motor is a motor in which the coil is located on the stator and the permanent magnet is on the outer rotor. Compared to ordinary motors, the rotor of a two-dimensional motor can conduct some axial movement while conducting rotational movement. A hydraulic pump is a hydraulic component that provides pressurized fluid in a hydraulic system, and is a conversion device that converts mechanical energy from an electric motor or internal combustion engine into hydraulic energy. A piston pump makes the working volume of a pump volume chamber change periodically to achieve the suction and discharge of liquid, by means of the reciprocating motion of the piston. Compared with ordinary piston pumps, a two-dimensional piston pump uses the two-dimensional motion conversion mechanism in which a piston part conducts two-dimensional motion of rotation and axial direct movements, which simultaneously realizes the function of oil suction and discharge and the function of flow distribution, thereby improving the volumetric efficiency and integration; the two-dimensional piston pump can continuously suck and discharge oil for many times with one rotation of the piston, which improves the power density.

The inventor of the present disclosure finds in the long-term research and development that in the current two-dimensional piston pump, the motor shaft drives the piston to rotate and move axially through the action of the cam with the motor shaft and the shaft of the piston being shaft-connected. Therefore, there are problems such as the motor shaft is subjected to axial force with high mechanical wear and tear, and the motor heats up seriously when running at high speed for a long time.

SUMMARY OF THE DISCLOSURE

The present disclosure provides a two-dimensional motor piston pump, in order to solve the technical problems of the prior art in the two-dimensional piston pump motor such as the motor shaft is subjected to axial force with high mechanical wear and tear, and the motor heats up seriously when running at high speed for a long time.

To solve the above technical problem, a technical solution adopted by the present disclosure is to combine the outer rotor of an outer rotor two-dimensional motor and the piston of a two-dimensional piston pump into one, thus called a two-dimensional motor piston pump. The two-dimensional motor piston pump includes a two-dimensional motor and a two-dimensional piston pump, the two-dimensional motor and the two-dimensional piston pump being nested with each other and arranged coaxially. The two-dimensional motor includes a stator and an outer rotor, and the outer rotor is coaxial with the stator and is sleeved outside the stator. The two-dimensional piston pump includes: a flow distribution mechanism, including a flow distribution rotor and a pump body; a piston mechanism, including a left cam and a right cam; wherein an inner surface of the left cam forms a gap seal with an outer surface of a left stator, defining a left volume chamber in cooperation with the flow distribution rotor; an inner surface of the right cam forms a gap seal with an outer surface of a right stator, defining a right volume chamber in cooperation with the flow distribution rotor; a roller assembly, including a roller and a roller shaft; wherein the roller assembly is fixed to the left stator and the right stator, and the roller is connected to concave and convex surfaces of the left cam and the right cam; and a pump housing, a left end cover, and a right end cover; wherein the pump housing is sleeved outside the pump body, and the pump housing defines a first flow channel port and a second flow channel port; the first flow channel port communicates with the first annular groove on the pump body, and the second flow channel port communicates with the second annular groove on the pump body; the left end cover and the right end cover are respectively arranged on both sides of the pump housing and are fixedly fitted to the pump housing, stator, and roller assembly.

BRIEF DESCRIPTION OF THE DRAWINGS

In order to more clearly illustrate the technical solutions in the embodiments of the present disclosure, the following is a brief description of the drawings used in the description of the embodiments, it is obvious that the drawings in the following description are only some of the embodiments of the present disclosure, and that other drawings can be obtained from these drawings without any creative work for a those skilled in the art.

Figure 1:
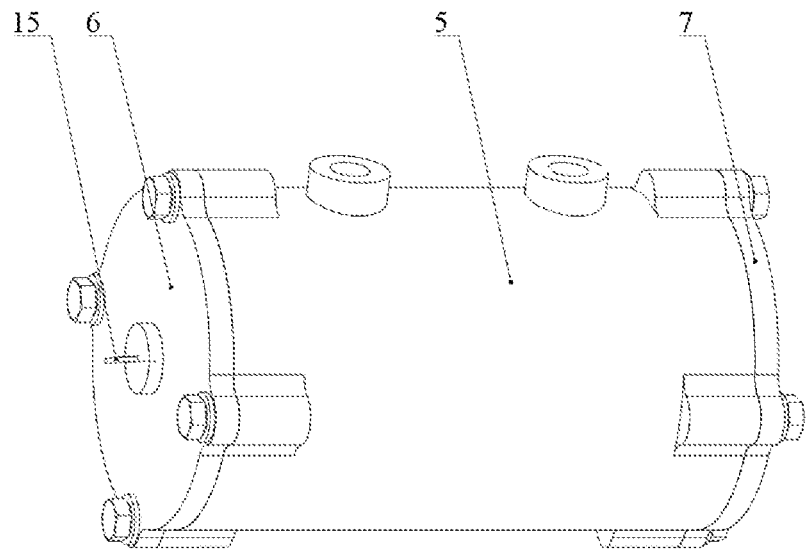
FIG. 1 is a perspective structural schematic view of a two-dimensional motor piston pump according to an embodiment of the present disclosure.

Reference numerals: 1. stator; 11. left stator; 111. fine shaft; 12. right stator; 13. stator coil; 131. core hole; 14. first positioning pin; 15. wire and controller; 2. outer rotor; 21. flow distribution rotor; 211. first groove; 212. second groove; 22. left cam; 23. right cam; 24. second positioning pin; 25. permanent magnet; 3. pump body; 311. first annular groove 312. second annular groove; 321. first through hole; 322. second through hole; 4. roller assembly; 41. roller; 42. roller shaft; 5. pump housing; 6. left end cover; 7. right end cover; V1. left volume chamber; V2. right volume chamber; A. first flow channel port; B. second flow channel port.

DETAILED DESCRIPTION

The technical solutions in the embodiments of the present disclosure will be clearly and completely described below with reference to the drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative work fall within the scope of the present disclosure.

The terms "first" and "second" in the present disclosure are only used for descriptive purposes, and should not be construed as indicating or implying relative importance or implicitly indicating the number of indicated technical features. In the description of the present disclosure, "a plurality of" means at least two, such as two, three, etc., unless otherwise expressly and specifically defined. Furthermore, the terms "including" and "having" and any variations thereof are intended to cover non-exclusive inclusion. For example, a process, method, system, product, or device including a series of steps or units is not limited to the listed steps or units, but optionally further includes unlisted steps or units, or optionally further includes other steps or units that are inherent to the process, method, product, or device.

Figure 2:
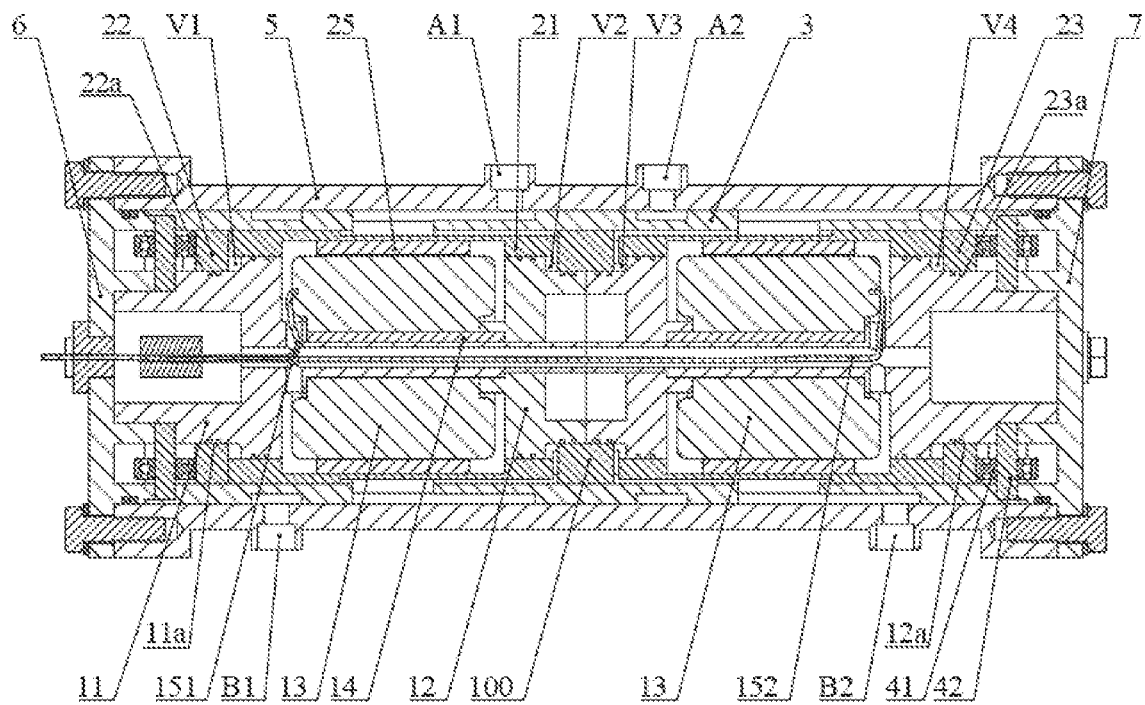
FIG. 2 is a cross-sectional structural schematic view of a two-dimensional motor piston pump according to an embodiment of the present disclosure.
Figure 3:
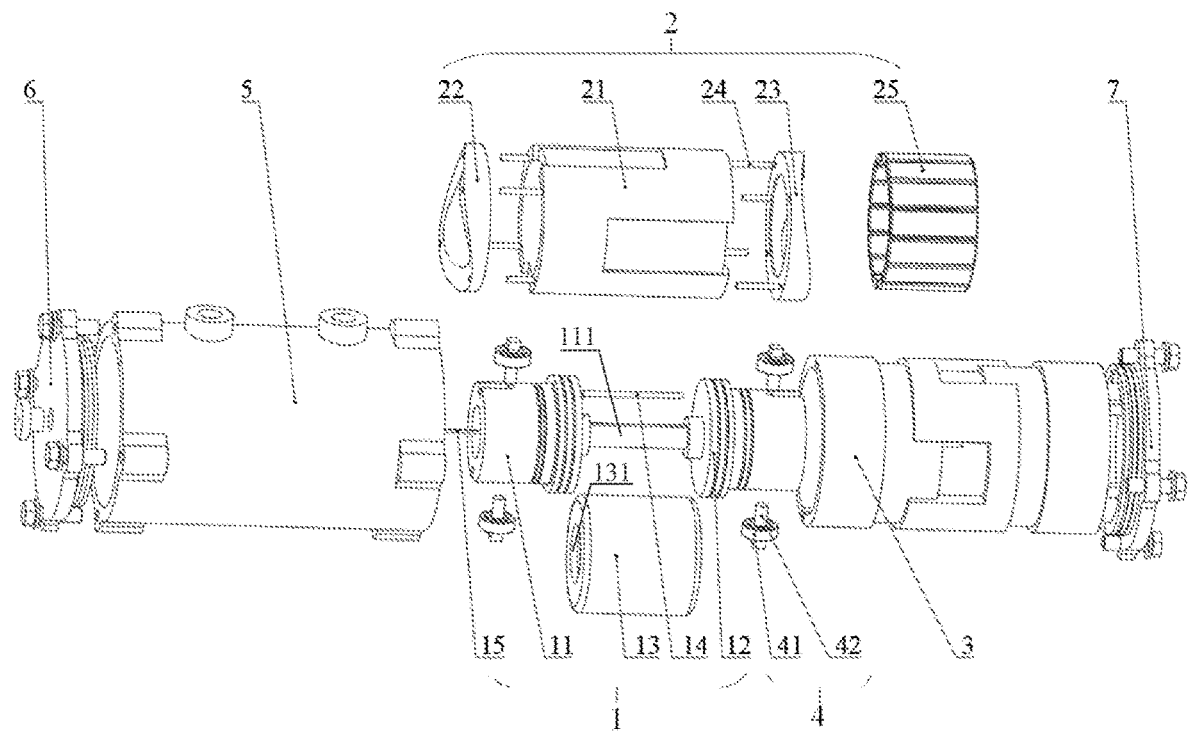
FIG. 3 is an exploded structural schematic view of a two-dimensional motor piston pump according to an embodiment of the present disclosure.
Figure 4:
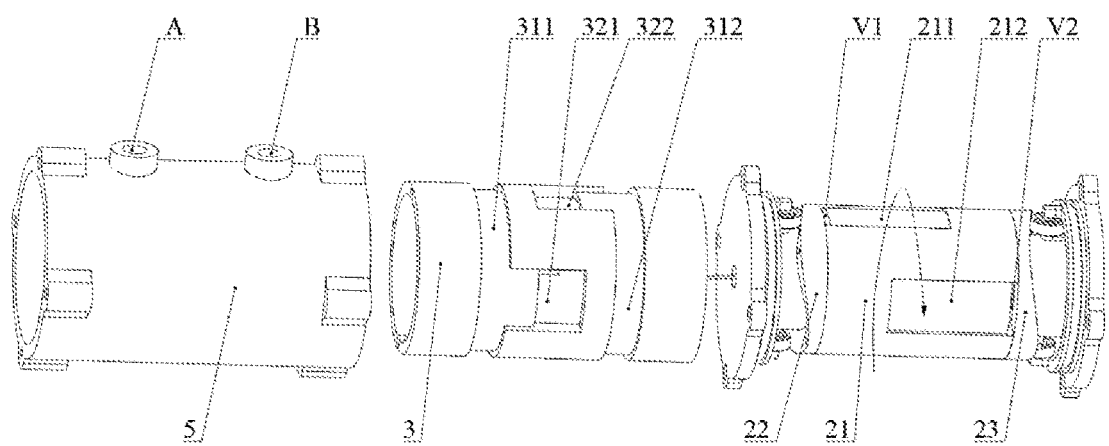
FIG. 4 is a schematic view of operations of suction and discharge liquid of a two-dimensional motor piston pump according to an embodiment of the present disclosure.

The present disclosure proposes a two-dimensional motor pump, as illustrated in FIGS. 1-4, FIG. 1 is a perspective structural schematic view of a two-dimensional motor piston pump according to an embodiment of the present disclosure, FIG. 2 is a cross-sectional structural schematic view of a two-dimensional motor piston pump according to an embodiment of the present disclosure, FIG. 3 is an exploded structural schematic view of a two-dimensional motor piston pump according to an embodiment of the present disclosure, and FIG. 4 is a schematic view of operations of suction and discharge liquid of a two-dimensional motor piston pump according to an embodiment of the present disclosure.

The two-dimensional motor piston pump in the embodiments includes a two-dimensional motor and a two-dimensional piston pump. The two-dimensional motor and the two-dimensional piston pump are nested with each other and arranged coaxially; an outer rotor 2 of the two-dimensional motor also serves as a piston and a flow distribution mechanism of the two-dimensional piston pump. A stator 1, the outer rotor 2 (piston and flow distribution mechanism of the pump), a pump body 3, and a pump housing 5 of the two-dimensional motor are sequentially sleeved from an inside to an outside and are arranged coaxially. In a current two-dimensional piston pump, the motor shaft drives the piston to rotate and move axially through the action of the cam with the motor shaft and the shaft of the piston being shaft-connected. Therefore, there are problems such as the motor shaft is subjected to axial force with high mechanical wear and tear, and the motor heats up seriously when running at high speed for a long time. The motor in the present disclosure is a two-dimensional motor. During operation, the outer rotor 2 performs rotational movement, that is, the piston and the flow distribution mechanism of the pump perform rotational movement to realize the flow distribution function. In addition, two ends of the outer rotor 2 are respectively cam surfaces. Further, the two cam surfaces are a left cam 22 and a right cam 23. The left cam 22 and the right cam 23 are the same but are installed staggeredly at 180° and are in contact with a shaft-fixed roller 41. Therefore, when the outer rotor 2 rotates, an axial movement is generated to realize two-dimensional motion of a rotational movement around the axis and an axial movement. The left cam 22 and the right cam 23 act as pistons also, and the axial movement will change the volume of the volume chambers V1 and V2, thereby realizing the functions of sucking and discharging liquid. The outer rotor 2 of the two-dimensional motor serves as the distribution mechanism and the piston of the two-dimensional piston pump at the same time, eliminating the transmission mechanism between the motor and the piston pump, thereby making the structure more compact. The outer rotor 2 of the two-dimensional motor does not require bearing support, thereby avoiding the problem of axial force affecting the life of the motor. The motor is a wet structure, with good heat dissipation, and it is not easy to cause sparks. The two-dimensional motor is applied to convert the rotational movement and axial movement of the rotor into magnetic coupling and decoupling, thereby reducing friction and improving efficiency. The two-dimensional piston pump structure is applied to improve volumetric efficiency.

In the embodiments, the two-dimensional motor includes the stator 1 and the outer rotor 2. The outer rotor 2 is coaxial with the stator 1 and is sleeved outside the stator 1 to form the outer rotor motor.

In the embodiments, the stator 1 of the two-dimensional motor further includes a left stator 11 and a right stator 12, both of which have multi-stage shoulders. An end of the left stator 11 is arranged with a fine shaft 111, and an outer end surface of the fine shaft 111 is threaded. Further, the left stator 11 extends an additional section of the fine shaft 111 than the right stator 12.

In the embodiments, the stator 1 of the motor further includes a stator coil 13, which is composed of windings, a cage, a silicon steel sheet, etc. The stator coil 13 defines a core hole 131 through the stator coil 13, the core hole 131 passes through the fine shaft 111 protruding from the left stator 11 and is placed between the left stator 11 and the right stator 12, and the shoulders protruding from the left stator 11 and the right stator 12 fit against an end surface of the stator coil 13 to constrain the axial movement of the stator coil 13. A first positioning pin 14 is embedded in an inner ring of the stator coil 13 and a groove of the fine shaft protruding from the left stator 11 to constrain the rotational movement of the stator coil 13. Further, the stator coil 13 is coaxially fixed to the left stator 11 and the right stator 12 by the first positioning pin 14. The fine shaft 111 of the left stator 11 is inserted into the right stator 12, and the threads on the outer end surface of the fine shaft 111 may be matched with nuts to fix the left stator 11, the right stator 12, and the stator coil 13 as a whole.

In the embodiments, the stator coil 13 of the motor is filled with working liquid, such as hydraulic oil, and the heat generated by heat-prone elements such as windings and silicon steel sheets during operation may be dissipated by oil cooling, resulting in higher safety when working in flammable and explosive environments.

In the embodiments, the stator 1 of the motor further includes a wire and a controller 15, which are connected to the stator coil 13 and are drawn out from a hole on the shaft of the left stator 11 to control the operation of the motor.

In the embodiments, the outer rotor 2 of the motor further includes a flow distribution rotor 21, which is coaxially sleeved outside the stator 1. An inner surface of the flow distribution rotor 21 defines an annular wide groove, and each of two end surfaces of the flow distribution rotor 21 defines a pin hole.

In the embodiments, the outer rotor 2 of the motor further includes permanent magnets 25, and the permanent magnets 25 are fixed at equal intervals on the annular wide groove on the inner wall of the flow distribution rotor 21. The width of the stator coil 13 is greater than the width of each permanent magnets 25, and an extra width at each end is greater than an axial stroke of the rotor 2 to ensure that the stator coil 13 is present in the radial direction of the permanent magnets 25 during the axial movement of the rotor 2.

In the embodiments, the outer rotor 2 of the motor further includes a left cam 22 and a right cam 23. A side of the cam is a convex surface. The shape of the convex surface is determined according to the required period and stroke. For example, the convex surface is in a shape similar to a sine function with a 5 mm difference between the crest and trough, and the axial stroke of the rotor is ±2.5 mm. The other side of the left cam 22 and the right cam 23 is flat, and the end surfaces define pin holes. The left cam 22 and the right cam 23 are fixedly connected with the flow distribution rotor 21 through a second positioning pin 24, and the cams at both ends are mounted at 180° staggered according to the crest or trough of the convex surface.

In the embodiments, the two-dimensional piston pump includes a flow distribution mechanism including the flow distribution rotor 21 and a pump body 3. An outer surface of the flow distribution rotor 21 defines four evenly distributed grooves, and the angle occupied by each groove in a circumferential direction is 45°. One group of two opposite grooves is a first groove 211 and opens to the same end surface, and the other group of two opposite grooves is a second groove 212 and opens to the other end surface. A radial hole is defined by cutting out from each end surface. The size of the radial hole, for example, is circumferentially the same width as the groove and axially 1 mm wide, such that the left volume chamber V1 and the right volume chamber V2 are connected to the first groove 211 and the second groove 212, respectively.

In the embodiments, the pump body 3 defines a first annular groove 311 and a second annular groove 312 that are symmetrically arranged in the circumferential direction, and four evenly distributed square through holes are defined between the two annular grooves. The angle occupied by each square through hole in the circumferential width is 45°, one group of two opposite through holes is a first through hole 321 and communicates with the first annular groove 311, and the other group of two opposite through holes is a second through hole 322 and communicates with the second annular groove 312. When the motor works, the flow distribution rotor 21 rotates, the grooves on the flow distribution rotor 21 are alternately connected with the through holes on the pump body 3 to realize the flow distribution, and the liquid is sucked or discharged from the volume chamber through the grooves on the flow distribution rotor 21 and the annular grooves on the pump body 3.

In the embodiments, the two-dimensional piston pump includes a piston mechanism including a left cam 22 and a right cam 23. The inner diameter of the left cam 22 and the right cam 23 is less than the inner diameter of the end surface of the flow distribution rotor 21, and the inner surfaces of the left cam 22 and the right cam 23 form gap seals with the outer surfaces of the shoulders of the left stator 11 and the right stator 12, respectively. The inner surface 21a of the left end of the flow distribution rotor 21 forms a gap seal with the outer surface 11a of the shoulder of the largest diameter of the left stator 11 to form the left volume chamber V1; the inner surface 21a of the right end of the flow distribution rotor 21 forms a gap seal with the outer surface 12a of the shoulder of the largest diameter of the right stator 12 to form the right volume chamber V2. When the left cam 22 and the right cam 23 move axially, they can function as pistons. The inner diameter and outer diameter of the annular left volume chamber V1 and right volume chamber V2 can be adjusted by adjusting the inner diameter of the left cam 22 and right cam 23 and the inner diameter of the end surface of the flow distribution rotor 21 to match the crest or trough values of the cams, i.e., the stroke of the piston, thereby achieving the desired displacement size.

In the embodiments, the two-dimensional piston pump includes a roller assembly 4, and the roller assembly 4 further includes a roller 41 and a roller shaft 42. There are four roller assemblies, with symmetrical arrangement of top and bottom, left and right. An end of the roller shaft 42 is square, and the other end is round. The square end is inserted into the corresponding groove of the pump body 3, and the round end is inserted into the corresponding groove of the left stator 11 or the right stator 12. The roller surface is in contact with the cam surface.

In the embodiments, the two-dimensional piston pump includes a pump housing 5, which is sleeved outside the pump body 3. The pump housing 5 defines a first flow channel port A and a second flow channel port B, which are connected to the first annular groove 311 and the second annular groove 312 on the pump body 3, respectively.

In the embodiments, the two-dimensional piston pump includes a left end cover 6 and a right end cover 7, which are respectively covered on both sides of the pump housing 5. An inner end surface of the right end cover 7 abuts against the pump body 3 and the right stator 12. A short column protruding from the inner end surface of the right end cover 7 matches corresponding grooves of the pump body 3 and the right stator 12, abutting against the two ends of a corresponding roller shaft 42. The left side is identical in structure, thus achieving a fixing effect on the stator 1, the roller assembly 4, and the pump body 3.

In the embodiments, for example, as shown in FIG. 4, the first through hole 321 and the second through hole 322 on the pump body 3 are exactly aligned with the second groove 212 and the first groove 211 on the flow distribution rotor 21, and the volumes of the left volume chamber V1 and the right volume chamber V2 are equal. When the outer rotor 2 rotates clockwise when viewed from right to left, the convex surfaces of the left cam 22 and the right cam 23 interact with the roller 41. Since the roller 41 is in a fixed position, a rightward axial force is generated on the left cam 22, pushing the outer rotor of the motor 2 (i.e. the piston part of the pump) to move axially to the right, thereby reducing the volume of the left volume chamber V1 and increasing the pressure; the liquid flows out of the left volume chamber V1 to the first groove 211 of the flow distribution rotor 2, flows out to the second annular groove 312 through the second through hole 322 on the pump body 3, and is discharged at the second flow channel port B of the pump housing 5. At the same time, the volume of the right volume chamber V2 increases, the pressure decreases, and the liquid is sucked in through the first flow channel port A of the pump housing 5, flows in through the first annular groove 311 on the pump body 3 from the first through hole 321, flows into the second groove 212 of the flow distribution rotor 2, and is finally sucked into the right volume chamber V2.

In the embodiments, for example, as shown in FIG. 4, the first groove 211 and the second groove 212 on the flow distribution rotor 21, the first through hole 321 and the second through hole 322 on the pump body 3 are each paired (the other groove thereof is on the rear side of FIG. 4) and symmetrical about the cylindrical plane, such that the radial force is balanced during the suction or discharge of the liquid. When the state as shown in FIG. 4 is turned by 45°, the first through hole 321 on the pump body 3 and the second groove 212 on the flow distribution rotor 21 are changed from being just completely aligned to being just completely separated. In this case, the rotor 2 moves to the rightmost end, and the two roller surfaces on the left are in contact with the crest of the convex surface of the left cam 22, the two roller surfaces on the right are in contact with the trough of the convex surface of the right cam 23, the volume of the left volume chamber V1 is reduced to zero, and the volume of the right volume chamber V2 is increased to the maximum. When the rotor 2 continues to rotate, the contact surface between the two roller surfaces on the right and the convex surface of the right cam 23 gradually changes from the trough to the peak, and the left side changes in the opposite manner; the rotor 2 is subjected to a leftward axial force, and at this time, the first through hole 321 on the pump body 3 communicates with the groove opposite the first groove 211 on the flow distribution rotor 21, and the second through hole 322 on the pump body 3 communicates with the second groove 212 on the flow distribution rotor 21; the volume of the left volume chamber V1 increases, the volume of the right volume chamber V2 decreases, and the liquid is still sucked from the first flow channel port A and discharged from the second flow channel port B, and so on and so forth, such that the liquid is continuously sucked and discharged.

The above description is only embodiments of the present disclosure and is not intended to limit the scope of the present disclosure. Any equivalent structure or equivalent process transformation made by using the contents of the description and drawings of the present disclosure, or directly or indirectly applied to other related fields of technology is similarly included in the scope of the present disclosure.

What is claimed is:

1. A two-dimensional motor piston pump comprising: a two-dimensional motor and a two-dimensional piston pump; wherein the two-dimensional motor and the two-dimensional piston pump are nested with each other and arranged coaxially;
    wherein the two-dimensional motor comprises a stator and an outer rotor, and the outer rotor is coaxial with the stator and is sleeved outside the stator, the stator comprises a left stator and a right stator;
    wherein the two-dimensional piston pump comprises:
    a flow distribution mechanism that is comprising a flow distribution rotor and a pump body;
    a piston mechanism that is comprising a left cam and a right cam; wherein an inner surface of the left cam forms a gap seal with an outer surface of the left stator, defining a left volume chamber in cooperation with the flow distribution rotor; an inner surface of the right cam forms a gap seal with an outer surface of the right stator, defining a right volume chamber in cooperation with the flow distribution rotor;
    a roller assembly, including a plurality of sets of rollers and roller shafts; wherein each set of the plurality of sets comprises one roller and one roller shaft, two sets of the plurality of sets of rollers and roller shafts are fixed to the left stator, another two sets of the plurality of sets of rollers and roller shafts are fixed to the right stator, and rollers of the two sets of the plurality of sets of rollers and roller shafts are connected to concave and convex surfaces of the left cam, rollers of the another two sets of the plurality of sets of rollers and roller shafts are connected to concave and convex surfaces of the right cam; and
    a pump housing, a left end cover, and a right end cover; wherein the pump housing is sleeved outside the pump body, and the pump housing defines a first flow channel port and a second flow channel port; the first flow channel port communicates with a first annular groove on the pump body, and the second flow channel port communicates with a second annular groove on the pump body; the left end cover and the right end cover are respectively arranged on both sides of the pump housing and are fixedly fitted to the pump housing, stator, and roller assembly.

2. The two-dimensional motor piston pump according to claim 1, wherein the stator comprises the left stator, the right stator, a stator coil, and a wire and a controller;
    wherein an end of the left stator is arranged with a fine shaft, and an end of the fine shaft is threaded;
    the right stator is coaxially fixed to the left stator by being threaded to the end of the fine shaft;
    the stator coil comprises windings, a cage, and a silicon steel sheet; a portion of the stator coil defines a core hole through the stator coil, the core hole passes through the fine shaft and the portion of the stator coil that defines the core hole is placed between the left stator and the right stator, and the stator coil is coaxially fixed to the left stator and the right stator by a first positioning pin;
    the wire and controller are drawn out from a hole on the shaft of the left stator.

3. The two-dimensional motor piston pump according to claim 1, wherein the outer rotor comprises:
    the flow distribution rotor that is coaxially sleeved outside the stator;
    a plurality of permanent magnets being fixed at equal intervals on an inner wall of the flow distribution rotor; and
    the left cam and the right cam, fixedly connected with a left end surface and a right end surface of the flow distribution rotor through second positioning pins, respectively.

4. The two-dimensional motor piston pump according to claim 3, wherein an outer surface of the flow distribution rotor defines four evenly distributed grooves, and an angle occupied by each groove in a circumferential direction is 45°;
    a group of two opposite grooves among the four grooves is a first groove and opens to the left end surface of the flow distribution rotor, and a group of the other two opposite grooves among the four grooves is a second groove and opens to the right end surface of the flow distribution rotor.

5. The two-dimensional motor piston pump according to claim 1, wherein the first annular groove of the pump body and the second annular groove of the pump body are symmetrically arranged in a circumferential direction, and four evenly distributed square through holes are defined between the first annular groove and the second annular groove; an angle occupied by each through hole in a circumferential width is 45°; a group of two opposite through holes among the four through holes is a first through hole and communicates with the first annular groove, and a group of the other two opposite through holes among the four through holes is a second through hole and communicates with the second annular groove.

* * * * *